United States Patent [19]

Thomas et al.

[11] Patent Number: 4,831,365
[45] Date of Patent: May 16, 1989

[54] CUTTING TOOL WEAR DETECTION APPARATUS AND METHOD

[75] Inventors: Charles E. Thomas, Scotia; Minyoung Lee, Schenectady; Douglas G. Wildes, Ballston Lake, all of N.Y.

[73] Assignee: General Electric Company, Schenectady, N.Y.

[21] Appl. No.: 153,300

[22] Filed: Feb. 5, 1988

[51] Int. Cl.⁴ ............................................. G01N 19/08
[52] U.S. Cl. ..................................... 340/680; 73/104; 73/660
[58] Field of Search .................. 340/680; 73/104, 660; 364/508

[56] References Cited

U.S. PATENT DOCUMENTS

| | | | |
|---|---|---|---|
| 3,548,648 | 12/1970 | Weichbrodt et al. | 73/104 |
| 4,207,567 | 6/1980 | Juengel et al. | 340/680 |
| 4,326,257 | 4/1982 | Sata et al. | 364/508 |
| 4,332,161 | 6/1982 | Kakino | 73/104 |
| 4,366,544 | 12/1982 | Shima et al. | 364/550 |
| 4,413,507 | 11/1983 | Drew et al. | 73/104 |
| 4,453,223 | 6/1984 | Ravel | 364/517 |
| 4,514,797 | 4/1985 | Begin | 364/148 |
| 4,520,674 | 6/1985 | Canada et al. | 73/660 |
| 4,547,771 | 10/1985 | Rochwood et al. | 340/683 |
| 4,558,311 | 12/1985 | Forsgren et al. | 340/680 |
| 4,563,897 | 1/1986 | Moore | 73/587 |
| 4,636,779 | 1/1987 | Thomas et al. | 340/680 |
| 4,644,335 | 2/1987 | Wen | 340/683 |
| 4,683,542 | 7/1987 | Taniguti | 364/508 |
| 4,707,688 | 11/1987 | Thomas | 340/680 |

FOREIGN PATENT DOCUMENTS 2140951 12/1984 United Kingdom ................ 340/680

OTHER PUBLICATIONS

K. J. Kim et al, "Progressive Tool Wear Sensing in Turning Operations Via Acoustic Emission Signal Processing", Integrated and Intelligent Manufacturing, American Society of Mechanical Engineers, pp. 297–307, (Dec. 1986).

A. Del Taglia et al., "An Approach to On-Line Measurement of Tool Wear by Spectrum Analysis", pp. 141–148, Unknown publisher, Unknown date.

*Primary Examiner*—Jerry W. Myracle
*Attorney, Agent, or Firm*—Donald R. Campbell; James C. Davis, Jr.; Paul R. Webb, II

[57] ABSTRACT

Sharp tools have different cutting characteristics from dull or worn tools. Among these differences is that a wear land develops on the cutting tool so that more of the cutting tool comes into contact with the workpiece during the cutting process. The increased contact area between the tool and workpiece forces more energy to be consumed by the cutting machine in making a cut because more energy is expended in non-productive work. Indications of an increase in non-productive work are the increased power or force necessary to operate a spindle in lathes, milling machines, etc., and the increased energy in cutting vibrations in a low frequency range emitted during the cutting process. Another indication of decreased efficiency of the cutting process is the decreased energy in cutting vibrations in a high frequency range emitted during the cutting process. A method and apparatus are described for continuously monitoring a ratio of spindle force or power or low frequency vibration energy to high frequency vibration energy during the cutting process, and generating an output warning signal when the ratio reaches a preselected level correlated with excessive tool wear.

28 Claims, 8 Drawing Sheets

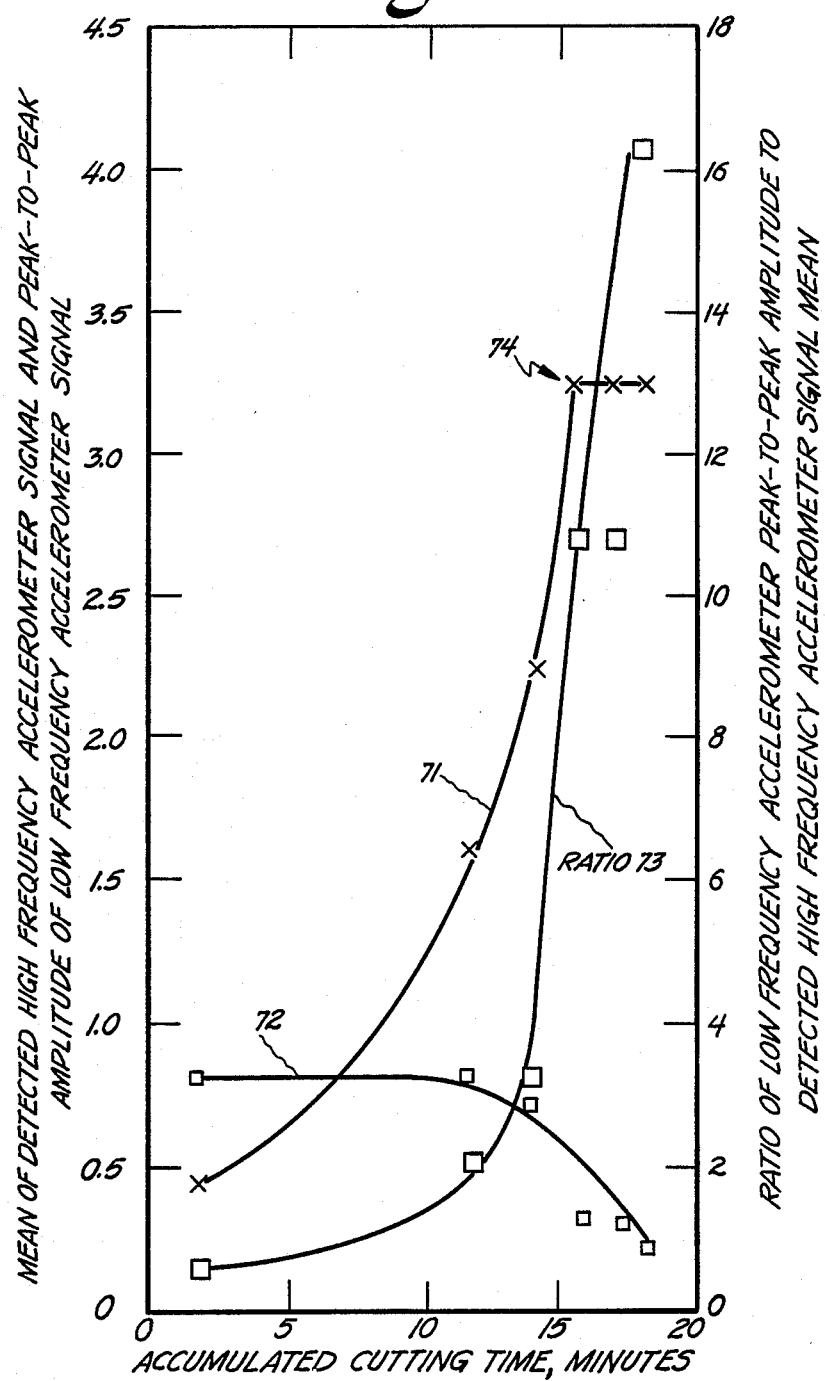

CUTTING TOOL WEAR DETECTION APPARATUS AND METHOD

BACKGROUND OF THE INVENTION

1. Field of the Invention

This invention relates to a method and apparatus for the automatic detection of cutting tool wear, and more particularly, to the automatic detection of worn cutting tools using statistical analysis techniques of the vibrational frequencies emanating from a cutting tool-workpiece interface and/or other working characteristics of a machine tool in the machining process to determine when the characteristics of an excessively worn cutting tool have been reached.

2. Technological Background

In performing machining operations on a workpiece in a machine tool such as a lathe, milling machine, or planer, the rate of wear of the cutting tool edge depends largely upon the workpiece material and machining conditions such as feed, speed, and depth of cut. Thus, the rate of wear can vary within wide limits. It is generally considered to be economical in production machining to operate the machine tool to achieve high metal removal rates, which means that the cutting tool wears out rapidly. The reason for this is that operator time and machine use time are expensive, whereas the cutting tool insert is relatively low priced.

Metal cutting tools usually reach the end of their useful lives via a wearout mechanism, rather than via an abrupt tool fracture. The accumulated cutting time before a tool should be discarded or reworked, even with a fixed cutting task, varies by a large factor, sometimes as large as 2 to 1, because of variability in quality among tools in a given batch, and because of large variations from batch to batch. Therefore, if no operator is present to detect and replace tools as they become worn out, it is necessary to schedule tool changes on the basis of the shortest life expected from any tool in the batch. The result is a tool budget far higher than would be necessary if each tool could be used to near the end of its own unique useful life. Thus, to prevent tool budget increases from reducing the savings in automation of the machining process that would otherwise result from reduced labor costs, a tool wearout indicator is needed.

However, as the tool wear rate increases, it becomes increasingly important to know exactly when to replace the worn cutting tool. If the cutting edge is replaced too soon, the operation is not economical, and if it is replaced too late and the workpiece is machined with an excessively worn cutting edge, this may result in incorrect dimensions and degrade the surface finish. Therefore, it is usually considered necessary to manually watch the cutting edge condition, even during an otherwise completely automatic machining operation, and manually replace the cutting insert when necessary. It is also possible to use an automatic insert changer, which can be set to replace each insert after a certain cutting time. However, all cutting tools do not fail after the same time interval, but over a range of time, and consequently the insert changer must be set to make the change at a shorter time interval to reduce the risk of running inserts which have failed. Most inserts will then be replaced before it is actually necessary, and optimum economy is not achieved.

By way of definition, the term "vibration" as used herein means any mechanical wave displacement, velocity or acceleration emitted by a tool when in use and encompasses the phenomenon known as "acoustic emission".

The term "machining conditions" as used herein refers to controlled factors in which, in a machining operation using a cutting tool, changes could give rise to substantial alterations in the tool vibration during machining, and specifically including cutting tool type, tool holder, cutting speed, feed rate, depth of cut, workpiece material, and amount and type of coolant. A change in one of these factors would result in a change in machining conditions.

One method utilized in the art to determine the extent of cutting tool wear has been a sonic worn cutting tool detection technique, such as that described in commonly assigned U.S. Pat. No. 3,548,648. The aforementioned patent utilizes a sonic energy transducer to convert the sonic vibrations to a continuous analog electrical signal, separating the analog signal into high and low frequency components in the range of 4–8 kHz and 0–4 kHz respectively, and comparing the analog signal high and low frequency components to each other to determine the extent of wear or condition of the cutting tool. When the ratio of the high and low frequency components reaches a certain predetermined level, an output signal is generated which is indicative of cutting tool wear.

In U.S. Pat. No. 3,548,648, the comparison of analog signals and the integrating process disclosed therein is time consuming and not as accurate in computing as would be possible in a digital mode. The ranges of vibrational frequencies utilized by the device disclosed in that patent are in the sonic range. Tool wear in the device was indicated by an increase in the high frequency energy level relative to the low frequency energy level.

In the aforementioned patent, the vibration frequency bands used include some of the resonant mechanical vibrational frequencies of the tool holders used to clamp the tool into place in the machine. These relatively low resonant frequencies could be easily excited by machinery noise not associated with the condition of the cutting edge of the tool. The tool holder resonant frequencies thus generated by machinery noise could lead to spurious results and premature or late indications of cutting tool wear. The levels indicative of cutting tool wear thus needed to be changed each time a change was made in the machining conditions. Machining conditions which affect the vibrational energy signature are the type and precise composition of the insert material; the shape of the insert and other geometry factors; methods of mounting the insert in the tool holder including material and geometry of the tool seat and use of a chip breaker; chatter; depth of cut, feed rate and spindle speed; roughness of the workpiece surface, including surface scale and previously machined holes; workpiece material; and cut discontinuities at the inside and outside corners.

Another method utilized in the field of tool wear detection utilizes a sensor for sensing the amount of force needed to continue machining a workpiece during the cutting operation. This method suffers from certain drawbacks, among these being a difficulty in installation, the need of extensive modification to the tool holders, and their great expense. Moreover, these devices are also sensitive to changes in the machining conditions, usually to the same degree or greater than their sensitivity to tool wear. Thus, the devices utilized by this method are not as accurate as may be desired.

As opposed to the above methods, the present invention uses a simple combination of a high frequency vibration signal sensor with another signal derived from the machining process that is indicative of the power used to machine a workpiece.

The present invention is distinguished from that of U.S. Pat. No. 3,548,648 in the use of a much higher (25 kHz to 100 kHz) high frequency vibration band, in relating tool wear to a decrease, rather than an increase in high frequency vibration energy; in lack of dependence upon mechanical resonances in a particular tool and tool holder arrangement; and in lack of sensitivity to changes in machining conditions.

SUMMARY OF THE INVENTION

Accordingly, an object of the present invention is to provide a cutting tool wear detection apparatus and method which are inexpensive, automatic, consistent, accurate and able to avoid false indications of cutting tool wear.

Another object and distinct advantage of the present invention is to provide an indicator of cutting tool wear which does not confuse normal machining operation condition changes with tool wear.

Another object of the present invention is to provide an apparatus for and method of reliably detecting excessive tool wear before damage to the part can occur, but not until near the optimum time for tool replacement.

Still another object and distinct advantage is the ability to detect a cutting tool wearout condition automatically and interface with the machine tool control to replace the worn tool without operator intervention.

Another advantage of the present invention is the accurate indication of cutting tool wear for a variety of machining conditions, without necessitating operator intervention or monitoring.

One feature of the present invention is the ability to continually monitor cutting tool wear indicators utilizing the vibrational frequencies of a high frequency component with a low frequency component which may have ranges outside the acoustic, or alternatively utilizing the high frequency energy component with a measure of the force or power needed to continue cutting a workpiece, thus providing a specific relationship of each indicator to the other so that when a threshold level is reached, an indication of tool wear is given. Moreover, the threshold level indicative of tool wear may be uniquely set for the particular machining conditions of each operation.

In accordance with the invention, the cutting tool wear detection apparatus comprises a vibration transducer for sensing vibrations at the tool-workpiece interface and generating an electrical signal indicative of the vibrations, a second sensing means for obtaining another signal either from the same transducer or from another sensor and converting that signal to an electrical signal, a preprocessing means for preprocessing both signals, a comparing means for comparing at least one statistical value of each of the preprocessed signals, and an output indication means for indicating a tool wear condition when a predetermined threshold relationship is reached in the comparison of the two signals.

The foregoing and other objects, features, and advantages of the invention will be apparent from the following more particular description of preferred embodiment of the invention, as illustrated in the accompanying drawings, wherein identical elements are referenced by identical reference numerals.

BRIEF DESCRIPTION OF THE DRAWINGS

FIG. 6 is a representation of a graph showing the vibration time domain characteristics as a function of time, and particularly showing the ratio of the peak-to-peak amplitude of the low frequency accelerometer signal component to the mean of the detected high frequency component;

DETAILED DESCRIPTION OF THE INVENTION

Figure 1:
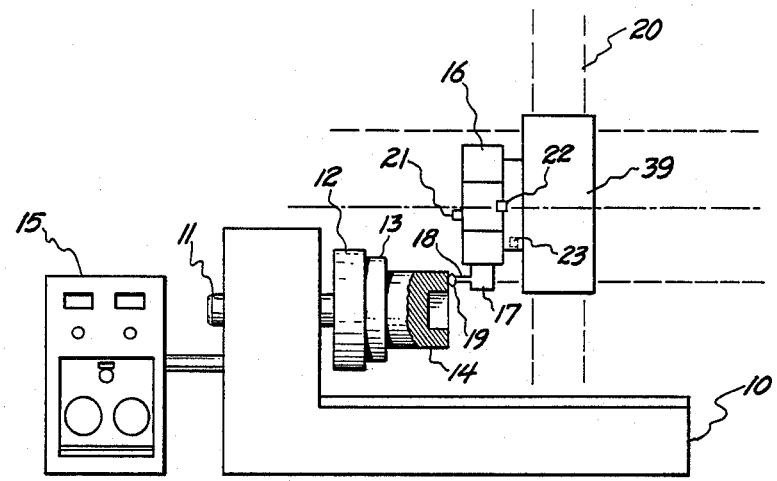
FIG. 1 is a partial elevational view of a horizontal turret lathe showing alternative positions of the accelerometer.
Figure 2:
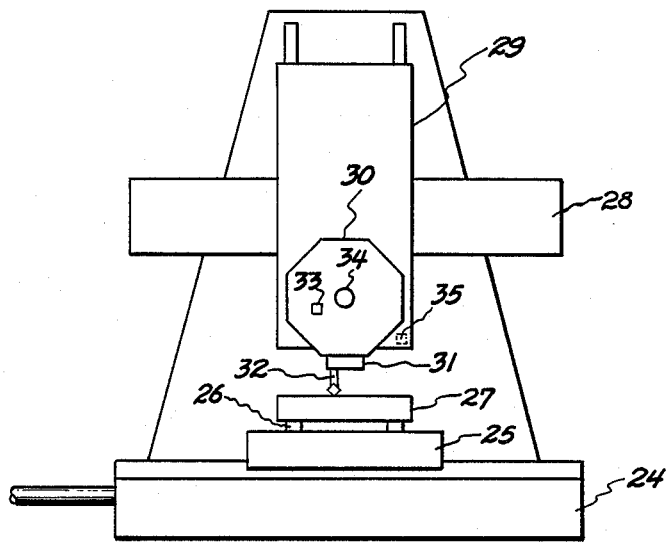
FIG. 2 is a simplified elevational view of a vertical turret lathe and shows alternative sensor positions.
Figure 3:
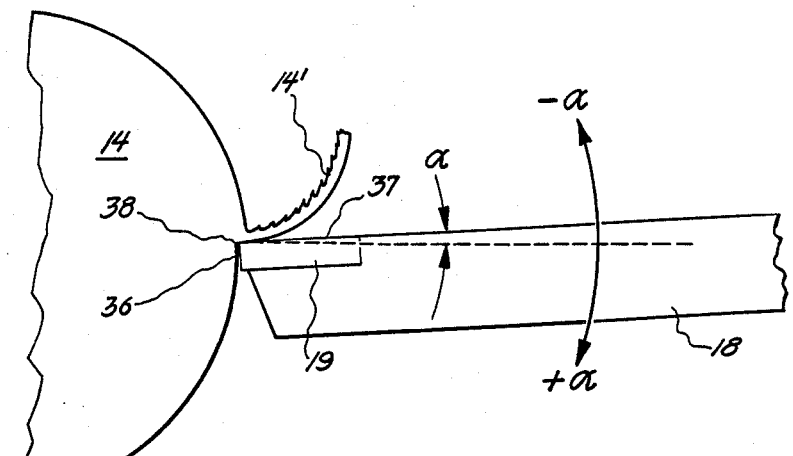
FIGS. 3, 3A and 3B are enlarged side views of a cutting tool insert and holder illustrating respectively a sharp edge and a worn edge in a lathe.
Figures 3A, 3B:
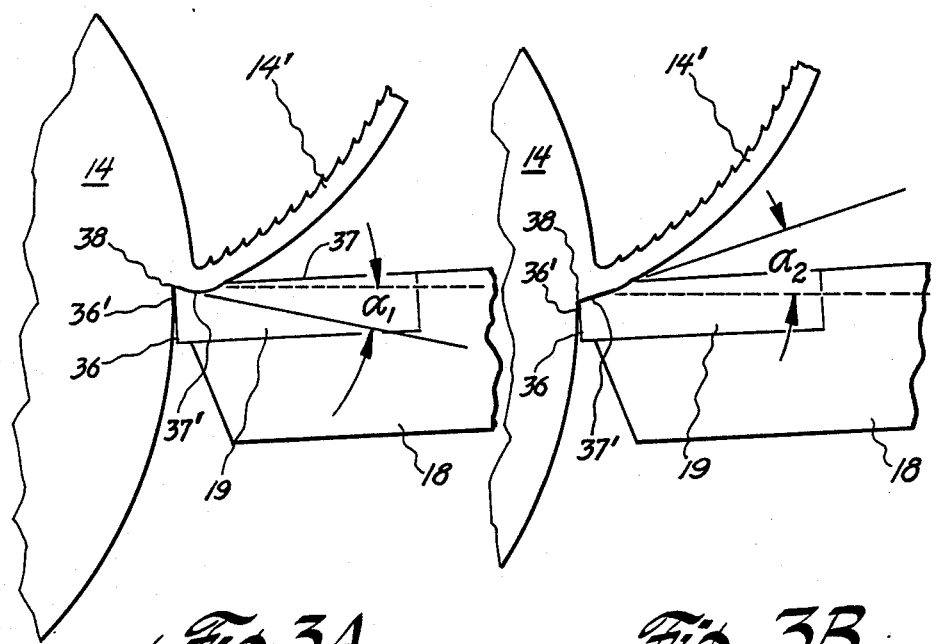

FIGS. 1 and 2 are simplified drawings of horizontal and vertical turret lathes and show one embodiment of the invention. The monitor is also applicable to other types of machine tools, such as milling machines as shown in FIGS. 3, 3A and 3B and further described hereinbelow, machining centers, and drills. The portion of the horizontal turret lathe illustrated has a machine frame 10, spindle shaft 11, chuck 12, fixture 13 for holding the workpiece 14, and a NC control station 15. A rotatable tool turret 16 has several tool holder posts 17 only one of which is shown, to support the tool holder 18 and cutting tool insert 19. The turret 16 is supported on a turret mount 39 which in turn has movement along the two cross slides 20. A vibration sensor 21 such as a broadband accelerometer is mounted on turret 16; thus, a single sensor in a single mounting position can monitor any tool holder position the operator selects for the cutting operation. This mounting location will usually provide a satisfactory signal to spurious noise ratio.

A rotating electrical coupler 22 is one way of transferring the electrical signal outputted by the transducer. Optionally, either a second vibration sensor 23 is mounted on the cross slide where no rotating coupler is required, or an alternate mounting position as shown is used, and tests have shown that good operation is obtained on some lathes. Whether the sensor can be mounted off the turret is a matter that must be experimentally determined on each machine to be monitored.

A vertical turret lathe is illustrated in FIG. 2 and two suitable vibration sensor mounting locations are shown at 33 and 35. The parts illustrated are the machine frame 24, chuck 25, work holding fixture 26, workpiece 27, cross slide 28, vertical slide 29, rotatable tool turret 30, tool post 31, and tool holder and cutting insert 32 (the numerical control unit is not shown). The vibration signal generated by turret-mounted sensor 33 is transmitted through the rotating electrical coupling 34 to the vibration detection circuitry shown in FIG. 4 and described in more detail below. An alternative mounting location is on one of the machine tool slides, or a second sensor 35 may be used which is in good vibrational contact with vertical slide 29.

During the machining process of the machine tool illustrated in FIG. 1, the turret mount 39 and the assembly 16–19 mounted thereon, are brought toward the revolving workpiece 14 until the cutting edge of tool insert 19 comes into contact with the workpiece 14, thus causing a cutting action. The cutting action causes vibrations to be generated at the cutting edge of the cutting tool insert 19, and these vibrations propagate through the cutting tool insert 19 and tool holder 18 and adjacent portions of the turret assembly 16 much in the same manner as sound waves in a room. The vibrational waves produced at the cutting edge propagate through the cutting insert 19, the tool holder 18, and the tool post 17, being additionally reflected at the boundaries and interfaces of these parts. The worn cutting tool detection method and apparatus disclosed by this embodiment utilizes the characteristics of the vibrations generated at the interface of a sharp cutting edge and the workpiece, which are different from the characteristics of the vibrations generated at the interface of a worn cutting edge and a workpiece.

Referring now to FIGS. 3, 3A and 3B, a sharp cutting edge 38 at the forward end of the cutting tool insert 19 generates vibrations caused by the formation and fracture of chips 14' during the machining operation as metal is removed from the surface of the workpiece 14 by the cutting tool insert 19. As the cutting edge 38 wears, a flattened wear land 36' is produced on the lower surface forming the cutting edge 38, known as the flank face 36, see FIGS. 3A and 3B, and the greater contact area of the worn cutting edge generates a different vibrational signature that is caused by sliding contact with the workpiece. The cutting process wears away the cutting edge 38 of the tool insert 19 so that a land wear 36' develops on flank face 36. One manifestation of the changed vibrational signature is the familiar squeal or screech produced by a worn cutting tool. Some of the most important effects of wear on the tool insert 19 itself are changes in the shape of the cutting edge 38. The major part of the tool wear occurs at two separate locations, the flank 36 and the rake faces 37 of the cutting edge 38. Increasing the flank wear land 36' makes the tool dull and increases the contact area between the tool insert 19 and the finished surface of the workpiece 14.

In the case of crater wear on the rake face 37, the initial progress of the crater wear land 37' effectively generates a sharper cutting edge 38 and an increased (more positive) local rake angle $\alpha_1$. However, the process also weakens the edge 38. As the tool continues to be used, the crater wear land 37' will break through the periphery of the cutting edge 38. At this point, the effective rake angle $\alpha_2$ of the edge becomes significantly more negative than that of the edge of the virgin tool shown in FIG. 3.

If the cutting process is such that a wear crater is not formed on the rake face 37, the initial increase of effective rake angle $\alpha$ will not occur. Increasing tool wear then causes wear and rounding of the cutting edge 38, leading to a steadily decreasing (more negative) rake angle $\alpha$, as shown in FIG. 3B.

The present invention discloses a novel method for using these consequences of rake face wear to detect the approaching end point of tool life.

In general, the cutting energy, as measured by the consumed horsepower, by the change in low frequency vibrational energy, or by various components of the cutting force, tends to increase with increasing flank wear land 36' and decreasing rake angle caused by increased friction between the flank wear land 36' and workpiece 14. However, the average high frequency vibrational energy generated during cutting tends to decrease with decreasing rake angle. One exception is for severe negative rake angles, where chips cannot escape from the cut zone, but are jammed against the rake face. For this exception, the vibrational emission energy increases and also has a different vibrational signature. The present invention is contemplated for use in combination with other tool break detection systems, such as that disclosed in commonly-assigned U.S. Pat. No. 4,636,779 which would enable the combination to recognize those events in which chips are jammed between the tool and the workpiece.

If, on the other hand, the effective rake angle $\alpha$ remains constant, the average high frequency vibrational energy generally remains proportional to the consumed cutting energy. Any changes in the machining conditions therefore have a similar impact on both the cutting energy and the average high frequency vibrational energy. The rake angle is the only cutting parameter which influences the cutting energy and the average high frequency vibrational energy in opposite directions. This allows the present invention to be utilized with a variety of machining conditions without necessitating the customizing of the parameters of the logic by which the present invention operates.

The particular embodiment disclosed in FIGS. 1 and 2 utilizes the comparison of vibrational energy emissions received from vibration sensor or sensors 21, 23, 33 or 35, depending on the particular machine tool configuration used. Two components of vibration information are obtained either from the same vibration sensor, which may be disposed, for example, at alternate positions 21 or 23, or alternatively from two separate sensors used in conjunction. The two components may be obtained by the splitting or separating of a broadband vibration signal into the frequencies desired for further processing, or each of two separate sensors may be specified to convert only a certain range of vibrational frequencies into the electrical signals fed into each of the component channels.

Figure 4:
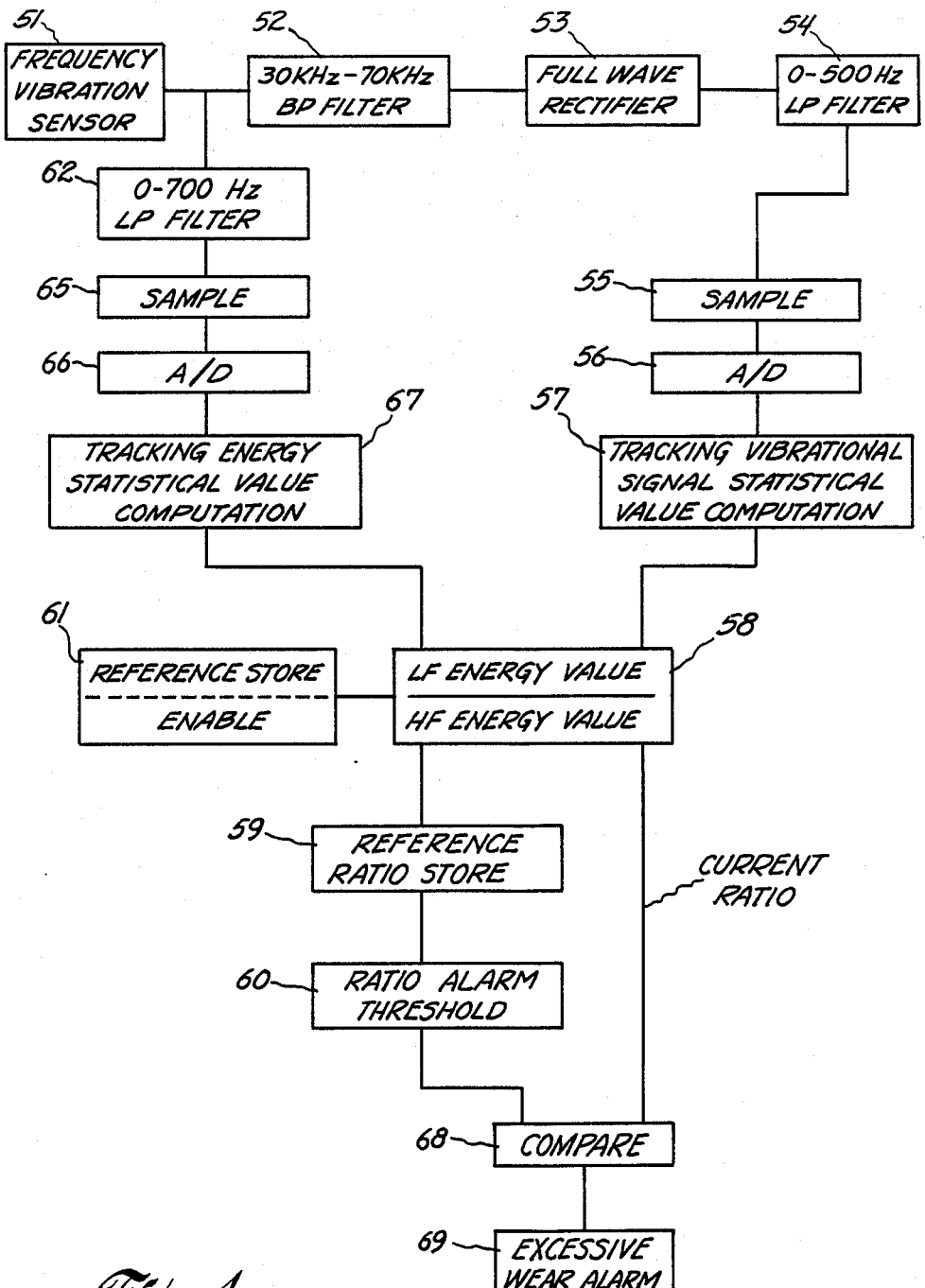
FIG. 4 is a block diagram of the cutting tool wear detection method, and shows the steps of the invention which indicate the threshold level of wear has been reached.

FIG. 4 illustrates in a preferred logic block diagram form, the steps necessary in the processing of the signals in the case of a single sensor which provides a vibrational frequency signal to the signal processing system which then processes the data obtained.

A vibrational frequency signal is obtained from a sensor, e.g. 21, as is shown in block 51 of the bock diagram. The signal is then separated by a bandpass filter 52 to obtain a component in the 25 kHz–100 kHz, but more preferably in the 30 kHz–70 kHz range, and a low pass filter 62 to obtain a component in the range below a low audio frequency, such as 100 Hz, but more preferably 700 Hz. Further processing of the two signals is then done independently.

The low frequency signals extracted by filter 62 are sampled, as shown in block 65, and converted from analog values to digital values at 66. The digital values are then processed to obtain at least one statistical value representative of the changes in vibration energy occurring in the low frequency range of vibrational signals, block 67. Such a value can, for example, be the peak-to-peak amplitude, the r.m.s. amplitude, the mean square amplitude, or the variance of the zero-mean low frequency signal.

One characteristic of vibrational energy samples resulting from the sampling process described above is that there is great volatility in the amplitude of vibrational energy. The volatility is caused by vibrational "noise" due to a number of factors including the way that chips are formed during the cutting process, chip dynamics noise or other factors not associated with tool wear. Thus, it is important to discount the effect of the noise signals on the computed statistical value, and thus a running or tracking statistical value which averages out the noise signals is computed by block 67.

The method of computing the tracking statistical value may be fairly simple. For instance, the sampled values from a time window of the vibration waveform are converted into a measure of the vibration energy. As time progresses, old samples are dropped out of the window, new samples are added, and the vibration energy is again computed to produce a tracking measure of recent vibration statistical value.

The second channel extracts only the frequency components in a high frequency band, such as 30 kHz–70 kHz, block 52, and detects this signal via a full wave rectifier 53, low pass filter 54 combination. The rectification process produces a non-zero mean which is a measure of the energy in the 30 kHz–70 kHz band. The low frequency components produced by the detection process are sampled, block 55, and converted to digital values, block 56, and a tracking mean signal representative of a statistical value of the energy in the high frequency band is derived or computed, block 57, in a way similar to the tracking energy measure of the low frequency band above.

Another system block 58 divides the tracking value of the low frequency energy component signal value by the tracking value of the high frequency energy component signal value so as to obtain a tracking ratio. At a predetermined time after a new tool has begun cutting, reference store enabling logic, block 61, enables the tracking ratio to be stored for a reference, block 59, and an alarm threshold is set equal to some factor times, or increment above, the stored reference value, block 60. Subsequent values of the tracking ratio are compared with this threshold, block 68, and an excessive wear alarm is issued, block 69, when the threshold level is reached.

Figure 5A:
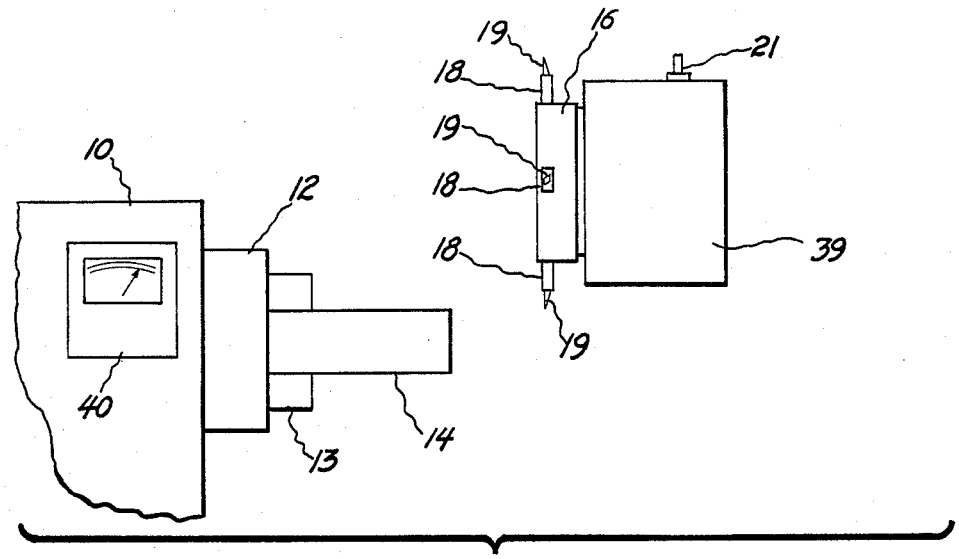
FIGS. 5A and 5B are simplified elevational views of a lathe and milling machine respectively, showing the placement of the accelerometer and power monitor in the alternative embodiment of the device.
Figure 5B:
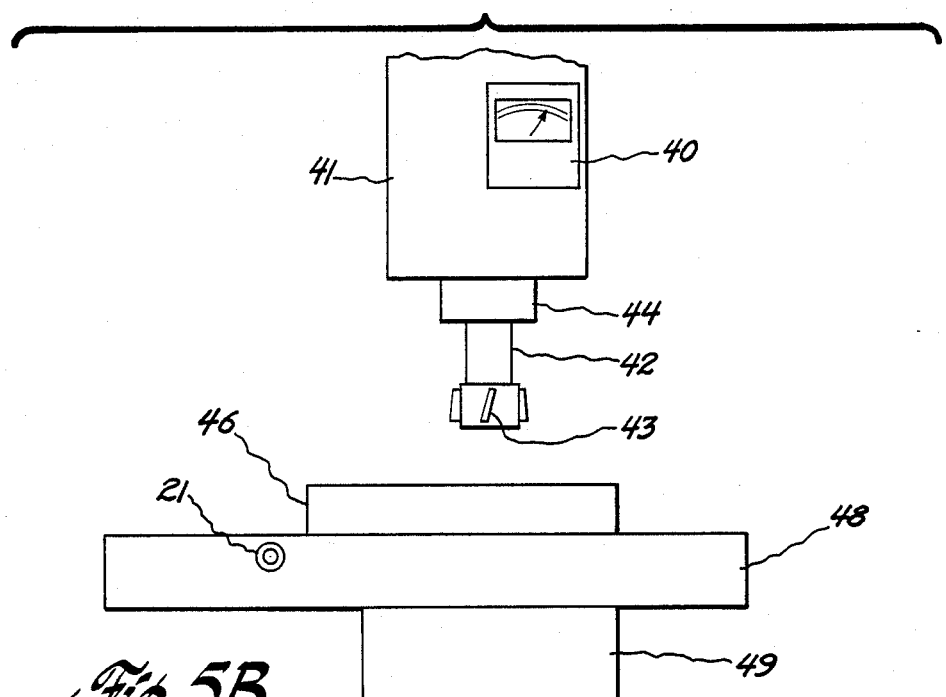

FIGS. 5A and 5B illustrate a second embodiment of the invention, in which two separate sensors are used. FIG. 5A shows a simplified drawing of a lathe having substantially identical elements to the lathe illustrated in FIG. 1. One difference in the FIG. 5 device is that lathe turret 16 holds a number of tool holders 18 and inserts 19.

A major difference, however, is that the FIG. 5A device has a second monitor 40 disposed on machine frame 10, in addition to vibration sensor 21 mounted on the turret mount 39. Monitor 40 may directly monitor any of a number of machine parameters which directly correlate to the amount of energy consumed by the machine tool in the machining process.

For instance, as shown in FIGS. 1 and 2 of the previous embodiment, the high frequency component correlates to the energy emitted by the tool-workpiece interface. As the tool cutting edge wears and the cutting process becomes less efficient, the high frequency vibration energy decreases.

Low frequency energy may be produced by a variety of means, each of which may be monitored and may be an indication of cutting tool wear. These means include sound energy, e.g. screeching, as well as low audio frequency vibrational energy emitted at the tool-workpiece interface, and also frictional heat energy produced by a worn cutting tool in the machining process.

Monitor 40 can thus be sensitive to changes in any of the parameters which either indirectly correlate to total energy consumed, such as the low frequency detection sensor described above, or that directly correlate to the energy. Direct correlates such as spindle horsepower or cutting force may be sensed by monitor 40, which may be any of a number of devices, e.g. power monitor, dynamometer, strain gauge, motor current monitor in the axis drive, etc. All that is necessary is that the monitor 40 somehow senses a parameter which directly or indirectly correlates to the energy consumed during the cutting process, and feeds the data obtained into the channel which processes it and computes a tracking energy statistical value, as shown in block 67 of FIG. 4.

Referring again to FIGS. 5A and 5B, a vibration sensor such as an accelerometer with high frequency response is attached directly to the tool holder 18, tool holder mounting device 39, or tool holder turret 16, or to the workpiece respectively 14 or 46, or workpiece fixture, such as table 48, so as to monitor the vibrational energy emitted by the cutting process. Simultaneously, the spindle horsepower consumed for cutting is monitored by monitor 40. Alternately, the cutting force may be monitored by any feasible method, e.g. dynamometer, strain gauge, etc., in place of the horsepower. FIGS. 5A and 5B depict typical installation methods for lathes and milling machines respectively.

As cutting proceeds and crater wear develops on the rake face 37 of tool insert 19 in FIG. 3A, the average high frequency vibrational energy may increase slightly and the horsepower may decrease slightly. But when the flank face wear land 36' becomes excessive and the effective rake angle $\alpha$ decreases significantly, the horsepower will increase and the average high frequency vibrational energy will decrease by larger amounts.

The particular embodiment of the invention as illustrated in FIGS. 5A and 5B monitors both the signal from the accelerometer 21 and the energy signal from monitor 40, and feeds the signals into NC control station 15 (not shown) where they are processed as the two separate component signals, as shown by example in FIG. 4. By way of example, the energy signal from monitor 40 would go directly to block 65 and further processing would continue with the separate signals as in the discussion of the block diagram illustrated in FIG. 4 above.

When the threshold ratio is stored, block 59, and the current ratio reaches the threshold ratio, computed at block 68, an excessive wear alarm is given, block 69. Tool holder turret 1 may then be automatically rotated, so that a new tool insert begins cutting, and the reference ratio may be reset and stored, as done by blocks 59, 61 in FIG. 4.

The elements of the embodiment illustrated in FIG. 5B show the present invention used in the configuration of a milling machine. Milling tool spindle housing 41 provides a support for a spindle (not shown) and milling tool holder 44, which may be a chuck or like element. Milling tool 42 is attached to the spindle by tool holder 44, and which all rotate within housing 41. Milling tools have one to twelve or more milling tool cutters 43 or cutting inserts (not shown). Monitor 40 may be attached to housing 41 or to NC control station 15 (not shown), and monitors energy consumption by means of one of the parameters described above, such as spindle horsepower.

Workpiece 46 is removably attached onto table 48. Table 48 with workpiece 46 may be horizontally or vertically displaced so as to bring workpiece 46 into contact with the milling tool 42. The accelerometer 21 may be disposed on table 48 or on spindle housing 41, but should be placed where the resonant vibrations of the spindle and other vibrational interference are minimized. Stationary support 49 provides support for and references the displacement of the table.

Referring now to FIG. 6, illustrated is a graph representing the vibrational time domain characteristics as a function of time for the apparatus and system described above with reference to FIGS. 1, 2 and 4. The graph represents experimental data derived through analysis of vibration signal tapes earlier recorded on a milling machine in the field. This off-line testing is believed to be an accurate indication of results which would be achieved on-line, since the signals receivable in the field would be virtually identical to the recorded signals used.

Points "X" represent the plotted values of the average peak-to-peak amplitude of the low (less than 700 Hz) frequency vibration signal and are connected by line 71. The detected high frequency vibration signal mean amplitude values are plotted and represented by small squares and are connected by line 72. As can be seen from curve 71, the low frequency peak-to-peak amplitude increases steadily as tool time accumulates until it levels off well past the time when the tool would normally be considered worn out. The slope of the signal amplitude increase also increases through most of the cutting time, and is maximum just prior to the point 74, where the increase stops. The mean of the detected high frequency signal, curve 72, remains approximately constant until it starts to drop off around 13 minutes of accumulated cutting time. The ratio 73 of the two curves 71 and 72 increases sharply in this 13-minute region. With this data, the reference value of the ratio might be captured some time in the first five minutes, where it is below 0.2. A threshold set at 5 time this reference would be somewhat less than 1.0 and would be exceeded in the 13 to 14 minute time frame, thus signaling a tool wear alarm well before excessive tool wear appears.

The computation of the detected high frequency vibration signal mean curve 72 values has been described above and further reference for its computation may be found in the aforementioned U.S. Pat. No. 4,636,779. The low frequency peak-to-peak amplitude signal, curve 71, is a measure of the running average amplitude of the low frequency signal samples. Other statistical values may be used to obtain a graph of changing signals in the low frequency range such as the statistical variance or RMS (root mean square) value of the amplitude signals. However, what is of interest fundamentally is the relationship between the powers in the two frequency bands. The straight-forward way of computing the low frequency channel power, if the vibration signal can be considered close enough to ergodic, would be to compute the statistical variance, or the mean of the square of the sample amplitude minus the square of the mean sample amplitude. This is the AC power, and as the low frequency channel has no DC component, it is also total power.

Any other measure of signal amplitude that might be computationally simpler could be substituted for the variance without serious effect on detection sensitivity. In the high frequency band, real-time computation of the predetected signal variance is a more formidable task. For this reason, the pertinent information on total channel power is translated to lower frequencies by the detection process, where it appears as the mean of the detected high frequency signal.

Root mean square (RMS) signal amplitude values may be a more effective measure of the signal strength for both high and low frequency ranges. High speed sensors and detectors are able to provide signal changes during very short intervals, and the period between samples obtained from the analog signal may be on the order of 1 to 5 microseconds. This would translate into a requirement for a great number of RMS calculations per second, thus providing a formidable computational task in real-time for microprocessors in the price range contemplated for use with the invention. Thus, a simple calculation using values such as peak-to-peak amplitudes, although detracting somewhat from the accuracy of the system, would provide an accurate enough ratio to efficiently and effectively detect substantial tool wear.

A ratio of the low and high frequency vibrational energy signals is utilized to more clearly delineate the point where a cutting tool has become worn. The change in the power of either the high or low frequency channel vibration signal with the progress of tool wear can be mimicked by similar changes due to changes in feed rate or depth of cut, but these potential false alarm sources have much less effect on the ratio criterion.

Figure 7:
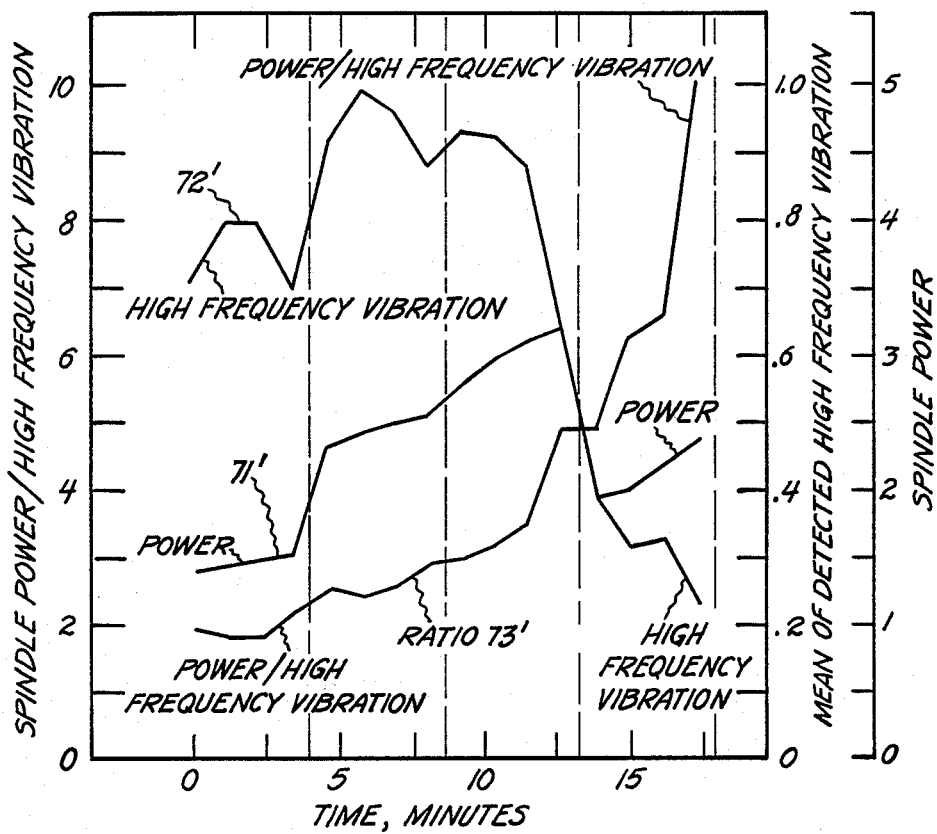
FIG. 7 is a representation of a graph showing the power expended in cutting, the mean of the high frequency vibration energy, and the ratio of the two signals, each plotted as a function of time.

Referring now to FIG. 7, the graph illustrated therein shows a summary of wear data obtained on-line in the field while milling titanium with a 1½ inch insertable carbide mill. The alternate embodiment of FIGS. 5A and 5B is studied wherein the power consumed by the spindle is monitored to obtain a graph represented as line 71' in FIG. 7. Line 72' represents a similar real-time computation of the mean of the detected high frequency vibration signal, as described above. Once again, the high frequency vibration signal curve 72' is seen to decline as a function of accumulated cutting time. It should be noted that cutting time represented by this graph is a series of 4 cuts on the same workpiece under varying machining conditions, and the overall cutting time of the tool is approximately 18 minutes. The high frequency vibration mean signal again begins a steep decline around the 13 minute mark, and the graph of the power signal 71' is simultaneously ascending. It should be noted that the power consumed, curve 71', and high frequency vibration mean signal level, curve 72', each follow the changes in the metal removal rate such as the increase occurring at the start of cut 2 (4.5 minutes) and the decrease after cut 3 (13.5 minutes). Their ratio, curve 73', however, is relatively immune to these variations and increases steadily as the tool wears.

In this example, the end of the tool life could be defined as the time at which the power/high frequency vibration ratio passes above a specified threshold. The threshold could be fixed, or set to some multiple, e.g. approximately three times, of the ratio measured when the tool was new. One could alternately apply similar threshold criteria to the rate of change of the power/high frequency vibration ratio.

Figure 8:
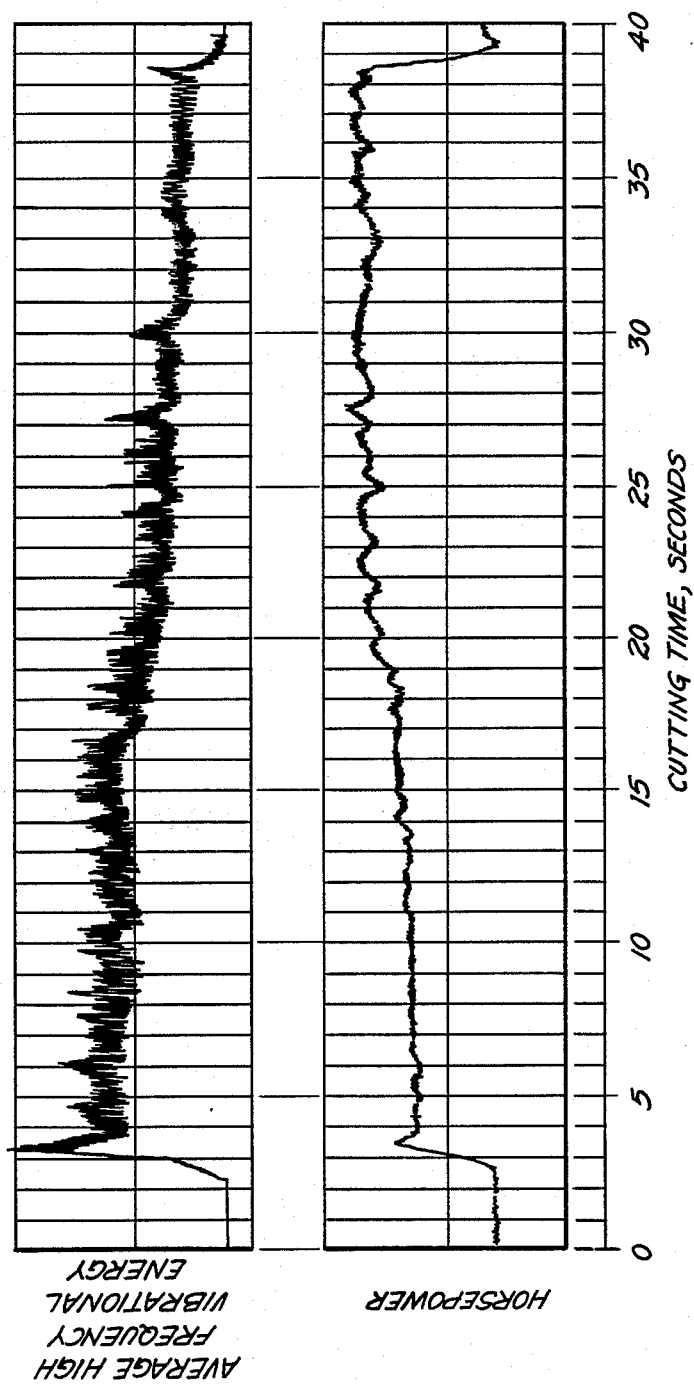
FIG. 8 is a representation of a graph showing each of the average high frequency vibrational energy and horsepower resulting during a turning operation using a ceramic tool each plotted as a function of time.

FIG. 8 illustrates the rapid (on the order of seconds) wear or "crumbly break" of a ceramic tool. This failure occurs as small chips of ceramic break off from the cutting edge, causing the rake angle to become more and more negative. The graph shows the power increasing steadily as the tool wears, while the average high frequency vibration energy decreases. End of tool life is in this case an arbitrary judgment, but could be specified in terms of either a threshold signal level or a threshold on the rate of change of the power/high frequency vibration ratio.

Figure 9:
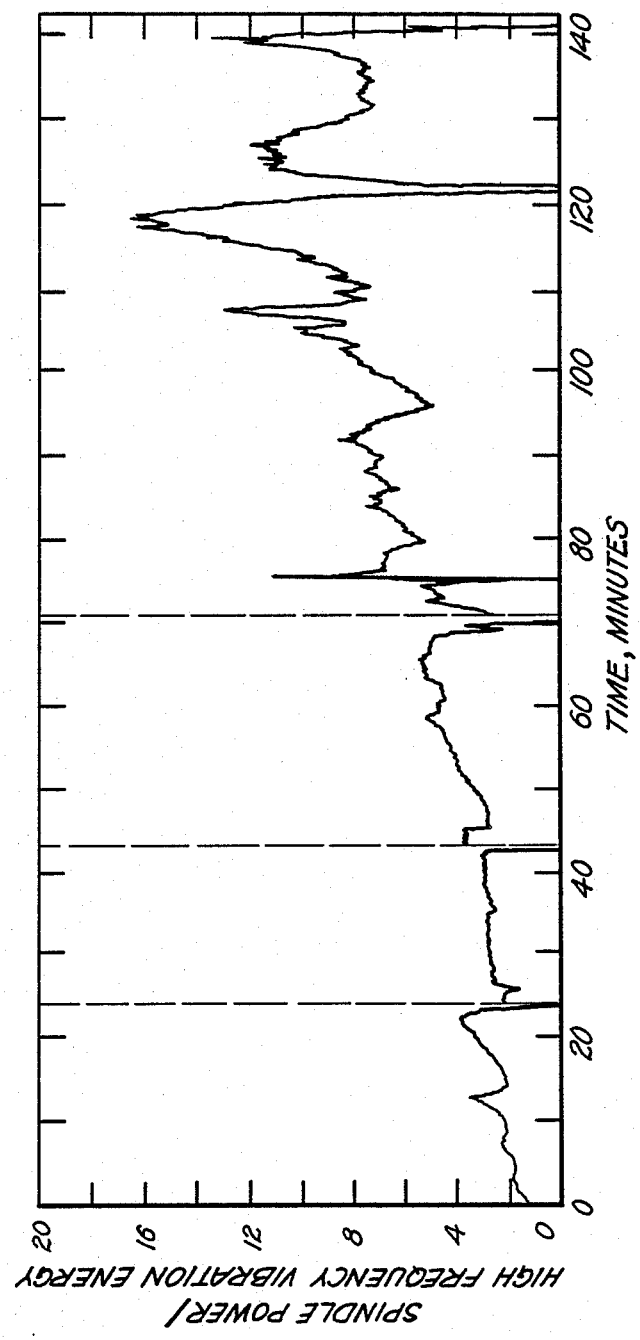
FIG. 9 is a representation of a turning experiment plotting the ratio of the mean of the high frequency vibration energy and the power expended in cutting, over a number of separate cuts encompassing about a 2.5 hour period and showing progressively severe tool wear.

FIG. 9 is a representation of a turning experiment plotting the ratio of power to high frequency vibration over a number of separate cuts encompassing about a 2.5 hour period and showing progressively severe wear of a carbide tool. The units on the vertical scale are not necessarily comparable to the units on the milling plots. The major divisions in the plot distinguish the four separate cuts made with this tool. The fourth cut was creating a contour on the part; consequently the depth of cut varied significantly and the signal dropped to zero in two places when the tool was not in contact with the part. This tool was worn but till usable at the end of the third cut. After the fourth, it was severely worn. If the present invention had been employed, a tool wear alarm should have been issued after 100–115 minutes of cutting.

While the invention has been particularly shown and described with reference to preferred embodiments thereof, it will be understood by those skilled in the art that various changes in form and details may be made without departing from the true spirit and full scope of the invention.

What is claimed is:

1. A method for automatically detecting worn cutting tools used in machining workpieces comprising the steps of:
    (a) sensing data during a machining operation and generating at least one electrical signal indicative of said data;
    (b) utilizing said at least one electrical signal to obtain at least two component signals, a first component signal indicative of data of high frequency vibration having a frequency range of from about 25 kHz to about 100 kHz at the tool-workpiece interface and a second component signal indicative of data corresponding to energy consumed during the cutting process;
    (c) sampling said first component signal to converting said sampled first component signal to digitized values and deriving a tracking cutting vibration signal corresponding to at least one statistical value of said first component signal that tracks changes in the vibration energy in that signal;
    (d) sampling said second component signal, converting said sampled second component signal to digitized values, and deriving a tracking signal corresponding to at least one statistical value of said second component signal that tracks changes in the energy in that signal;
    (e) using said tracking first component vibration energy signal and said tracking second component energy signal to obtain a ratio signal representative of the ratio of said tracking first and second component energy signals; and
    (f) producing an output indication when said ratio signal representative of said ratio reaches a predetermined threshold level indicative of a preselected amount of cutting tool wear.

2. The method according to claim 1 wherein the step of utilizing said at least one electrical signal further comprises separating one electrical signal indicative of the vibration at the tool-workpiece interface into two component signals, said first component signal being indicative of high frequency vibration data and said second component signal being indicative of low frequency vibration data corresponding to data of energy consumed during the cutting process.

3. The method according to claim 2 wherein said statistical value of both component signals corresponds to the statistical variance.

4. The method according to claim 2 wherein said statistical value of both component signals corresponds to the peak-to-peak amplitude of each component signal.

5. The method according to claim 2 wherein said statistical value for said first component signal corresponds to the peak-to-peak amplitude of the signal, and said statistical value for said second component signal corresponds to the statistical variance of the signal.

6. The method according to claim 2 further comprising an additional step of detecting said first high frequency component signal before the step of sampling of the high frequency component signal, where the said statistical value of the said high frequency component signal is the mean of the said detected signal.

7. The method according to claim 2 wherein said first high frequency component signal is limited to frequencies in a range of from about 30 kHz to about 70 kHz and said second low frequency component signal is limited to frequencies in a range of less than 700 Hz.

8. The method according to claim 1 wherein said predetermined threshold level indicative of a preselected amount of cutting tool wear is determined by the steps of:
    (a) determining a reference ratio of the levels of the two frequency component signals from samples taken during a period at the initial stages of cutting of a newly replaced tool;
    (b) multiplying said reference ratio by a preselected value to generate said predetermined threshold value indicative of a preselected amount of cutting tool wear.

9. The method according to claim 8 wherein said predetermined threshold level is determined from samples taken during a period of approximately five minutes following the beginning of cutting with a newly replaced tool.

10. The method according to claim 8 wherein said reference ratio is multiplied by a preselected value equal to approximately three to approximately five in order to generate said predetermined threshold value.

11. The method according to claim 1 wherein the steps of sensing data and of utilizing said signal further comprise independently sensing data through at least two data sensing means and generating at least two component electrical signals, a first component signal being indicative of data of high frequency vibration at the tool-workpiece interface and a second component signal indicative of the energy consumed in the cutting process.

12. The method according to claim 11 wherein the second component signal is indicative of spindle horsepower.

13. The method according to claim 11 wherein the second component signal is indicative of cutting force necessary to drive a spindle of the machine.

14. The method according to claim 11 wherein the second component signal is indicative of feed force necessary to drive an axis of the machine.

15. An apparatus for automatically detecting worn cutting tools used in machining workpieces by a machine comprising;
 (a) at least one sensor for sensing characteristics of the machine during a machining operation and for generating an electrical signal corresponding to said characteristics;
 (b) a first bandpass filter means for extracting at least a first component signal from said electrical signal generated by said at least one sensor, said first component signal corresponding to a high frequency vibration signal in the range of from about 25 kHz to about 100 kHz;
 (c) consumed energy monitoring means extracting at least a second component signal from said at least one sensor, said second component signal being indicative of the energy consumed during the machining operation;
 (d) sampling means for sampling each of said component signals and for generating a signal indicative of the relationship between at least one statistical value of each of said sampled component signals; and
 (e) alarm means for producing an output indication indicative of a predetermined degree of cutting tool wear when said signal indicative of the relationship between said at least one statistical value of each of said sampled component signals reaches a predetermined threshold value indicative of a predetermined degree of cutting tool wear; wherein said at least one sensor comprises a vibration transducer for generating an electrical signal corresponding to a broadband vibrational frequency spectrum; and said consumed energy monitoring means further comprises a low pass filter means for extracting said second component signal from said electrical signal generated by said vibration transducer, said second component signal corresponding to a low frequency vibration signal in a range of less than about 700 Hz, and being indicative of the energy consumed during the machining operation.

16. The apparatus according to claim 15 wherein said sampling means comprises a means for sampling short duration values of each of said component signals;
 an analog to digital converter for converting each of said sampled values from analog to digital; and
 a computation means for computing said at least one statistical value of each of said sampled component values, for computing a relationship between said sampled values, and for generating a signal indicative of said relationship.

17. The apparatus according to claim 16 wherein said statistical value computed for the high frequency component signal is a tracking measure of the peak-to-peak amplitude of the high frequency vibration signal and said statistical value computed for the low frequency component signal is a tracking measure of the statistical variance of the amplitude of the low frequency vibration signal.

18. The apparatus according to claim 15 wherein said first bandpass filter means includes means for detecting the high frequency component signal data and filtering the detected signal to a low base band range of less than about 500 Hz.

19. An apparatus for automatically detecting worn cutting tools used in machining workpieces by a machine comprising:
 (a) at least one sensor for sensing characteristics of the machine during a machining operation and for generating an electrical signal corresponding to said characteristics;
 (b) a first bandpass filter means for extracting at least a first component signal from said electrical signal generated by said at least one sensor, said first component signal corresponding to a high frequency vibration signal in the range of from about 25 kHz to about 100 kHz;
 (c) consumed energy monitoring means extracting at least a second component signal from said at least one sensor, said second component signal being indicative of the energy consumed during the machining operation;
 (d) sampling means for sampling each of said component signals and for generating a signal indicative of the relationship between at least one statistical value of each of said sampled component signals; and
 (e) alarm means for producing an output indication indicative of a predetermined degree of cutting tool wear when said signal indicative of the relationship between said at least one statistical value of each of said sampled component signals reaches a predetermined threshold value indicative of a predetermined degree of cutting tool wear; wherein said consumed energy monitoring means comprises a power monitor which senses the amount of horsepower necessary for spindle rotation during the machining operation, and generates a second component signal indicative thereof.

20. An apparatus for automatically detecting worn cutting tools used in machining workpieces by a machine comprising:
 (a) at least one sensor for sensing characteristics of the machine during a machining operation and for generating an electrical signal corresponding to said characteristics;
 (b) a first bandpass filter means for extracting at least a first component signal from said electrical signal generated by said at least one sensor, said first component signal corresponding to a high frequency vibration signal in the range of from about 25 kHz to about 100 kHz;
 (c) consumed energy monitoring means extracting at least a second component signal from said at least one sensor, said second component signal being indicative of the energy consumed during the machining operation;
 (d) sampling means for sampling each of said component signals and for generating a signal indicative of the relationship between at least one statistical value of each of said sample component signals; and (e) alarm means for producing an output indication indicative of a predetermined degree of cutting tool wear when said signal indicative of the relationship between said at least one statistical value of each of said sampled component signals reaches a predetermined threshold value indicative of a predetermined degree of cutting tool wear; wherein said consumed energy monitoring means comprises a force monitor for sensing the amount of force necessary to continue spindle rotation at a predetermined speed during the machining operation, and for generating a second component signal indicative thereof.

21. The apparatus according to claim 20 wherein said force monitor further comprises a dynamometer.

22. The apparatus according to claim 20 wherein said force monitor further comprises a strain gauge.

23. An apparatus for automatically detecting worn cutting tools used in machining workpieces by a machine comprising:

(a) at least one sensor for sensing characteristics of the machine during a machining operation and for generating an electrical signal corresponding to said characteristics;

(b) a first bandpass filter means for extracting at least a first component signal from said electrical signal generated by said at least one sensor, said first component signal corresponding to a high frequency vibration signal in the range of from about 25 kHz to about 100 kHz;

(c) consumed energy monitoring means extracting at least a second component signal from said at least one sensor, said second component signal being indicative of the energy consumed during the machining operation;

(d) sampling means for sampling each of said component signals and for generating a signal indicative of the relationship between at least one statistical value of each of said sampled component signals; and (e) alarm means for producing an output indication indicative of a predetermined degree of cutting tool wear when said signal indicative of the relationship between said at least one statistical value of each of said sampled component signals reaches a predetermined threshold value indicative of a predetermined degree of cutting tool wear; wherein said consumed energy monitoring means comprises a force monitor for sensing the amount of force necessary to continue axis motion at a predetermined speed during the machining operation, and for generating a second component signal indicative thereof.

24. The apparatus according to claim 23 wherein said force monitor further comprises a dynamometer.

25. The apparatus according to claim 23 wherein said force monitor further comprises a strain gauge.

26. An apparatus for automatically detecting worn cutting tools used in machining workpieces by a machine comprising:

(a) at least one sensor for sensing characteristics of the machine during machining operation and for generating an electrical signal corresponding to said characteristics;

(b) a first bandpass filter means for extracting at least a first component signal from said electrical signal generated by said at least one sensor, said first component signal corresponding to a high frequency vibration signal in the range of from about 25 kHz to about 100 kHz;

(c) consumed energy monitoring means extracting at least a second component signal from said at least one sensor, said second component signal being indicative of the energy consumed during the machining operation;

(d) sampling means for sampling each of said component signals and for generating a signal indicative of the relationship between at least one statistical value of each of said sampled component signals; and (e) alarm means for producing an output indication indicative of a predetermined degree of cutting tool wear when said signal indicative of the relationship between said at least one statistical value of each of said sampled component signals reaches a predetermined threshold value indicative of a predetermined degree of cutting tool wear; wherein said predetermined threshold value of said signal means comprises a multiple of preselected value and a ratio of said second and first component signals sampled during the five minutes of machining operations immediately following the initiation of a machining operation by a newly replaced tool.

27. The apparatus according to claim 26 wherein said statistical value computed by said sampling means for both component signals is the statistical variance.

28. The apparatus according to claim 26 wherein said statistical value computed by said sampling means is the root mean square value of the amplitude for both component signals.

* * * * *